Oct. 6, 1936.   N. T. ANDERSON   2,056,704
CARGO MERCHANDISE BRACING MEANS
Filed Nov. 8, 1934   5 Sheets-Sheet 1
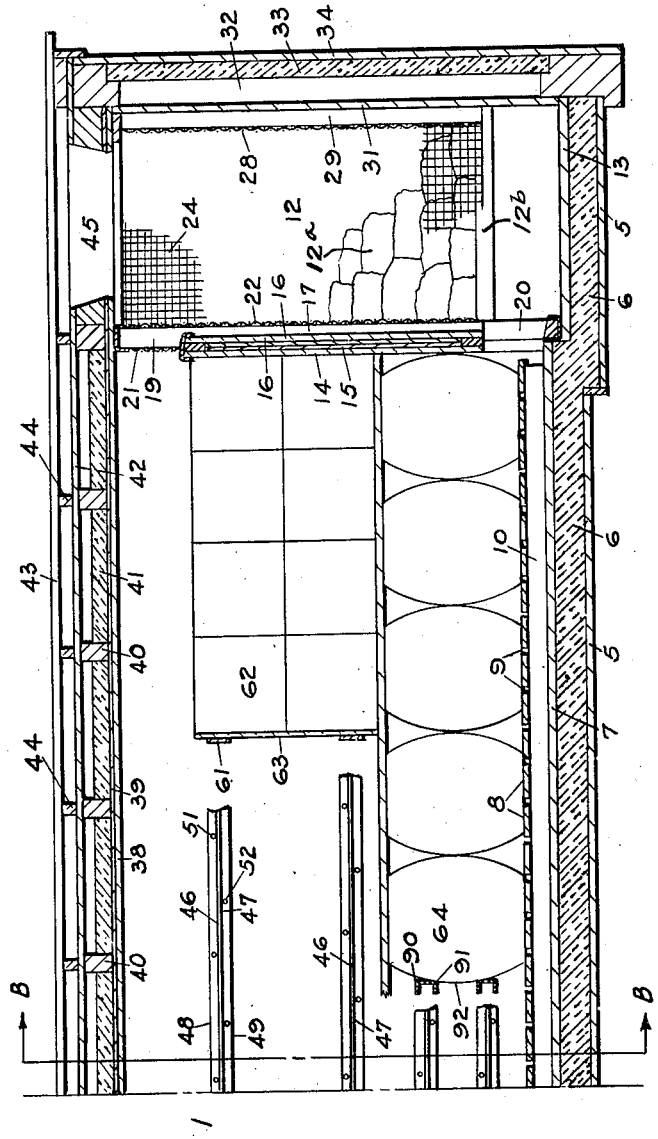
FIG I
INVENTOR.
Norman T. Anderson,
BY
ATTORNEY.

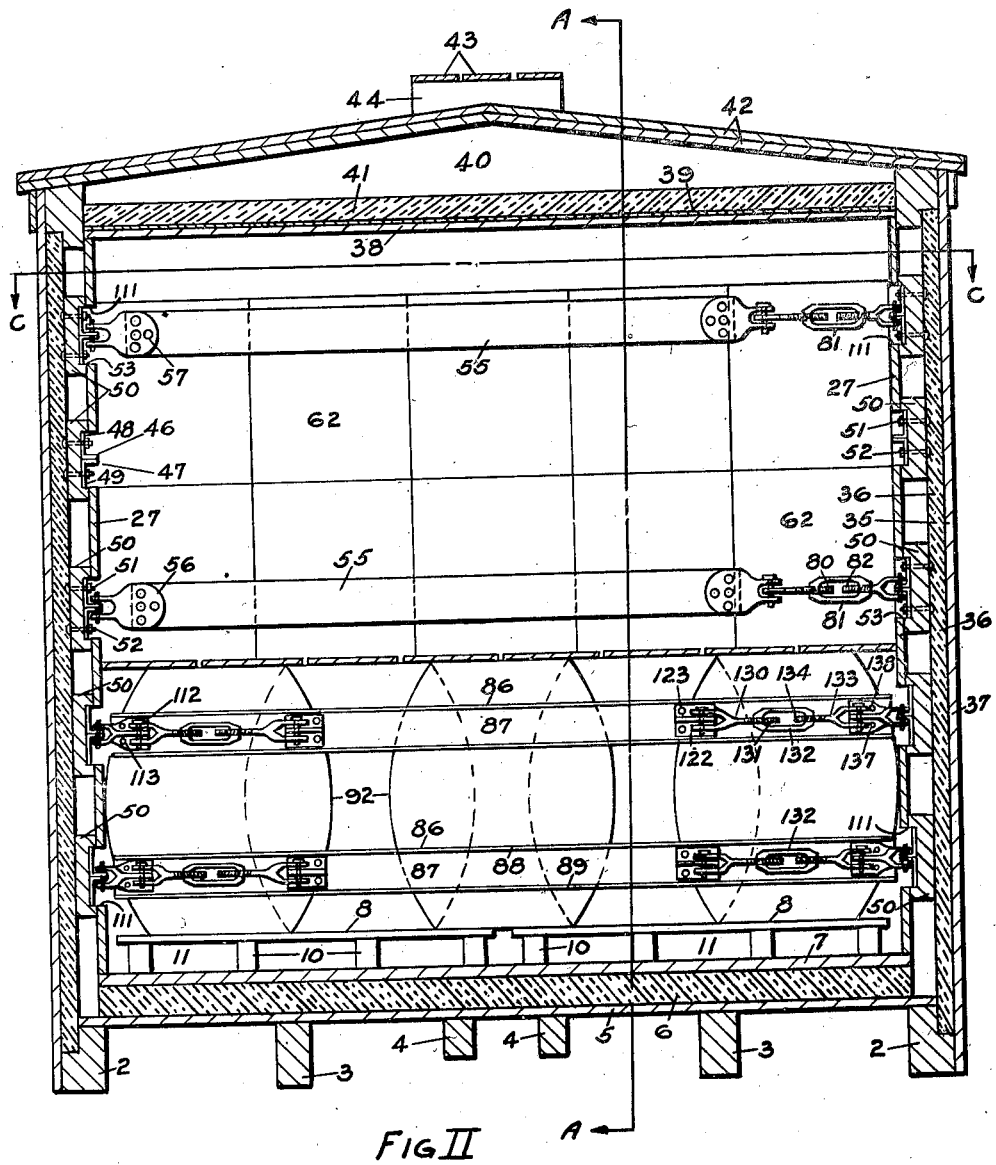

Oct. 6, 1936.    N. T. ANDERSON    2,056,704
CARGO MERCHANDISE BRACING MEANS
Filed Nov. 8, 1934    5 Sheets-Sheet 3
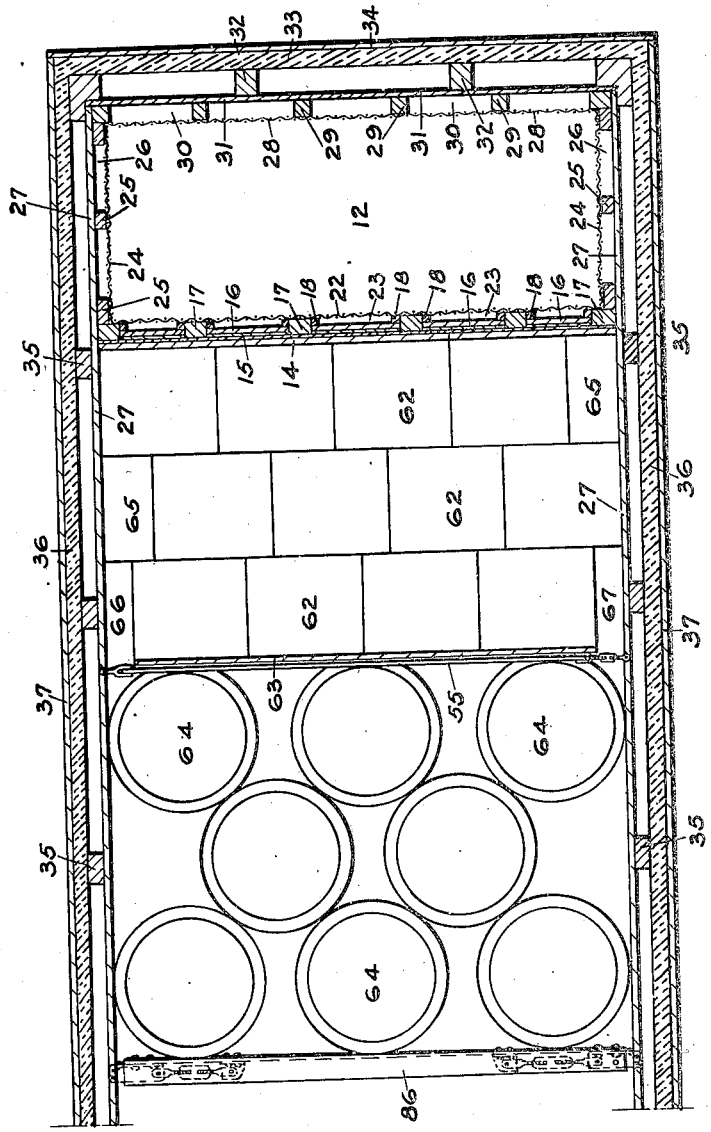
FIG. III

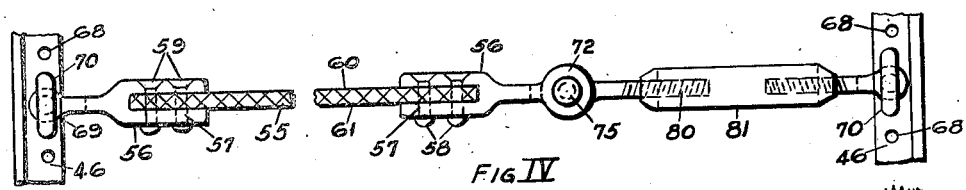
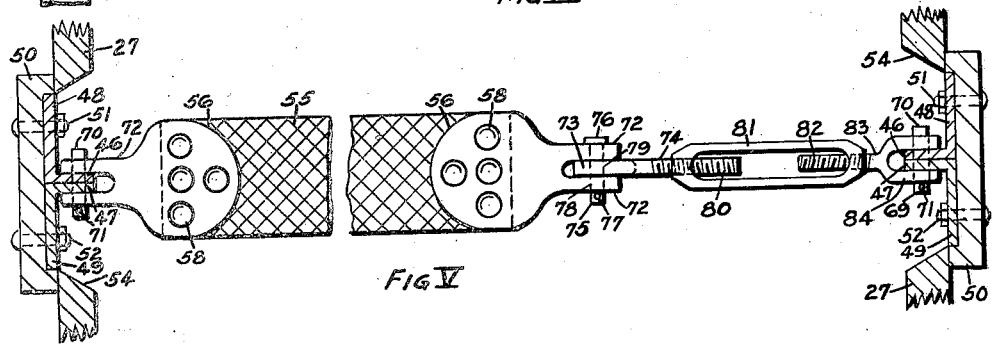
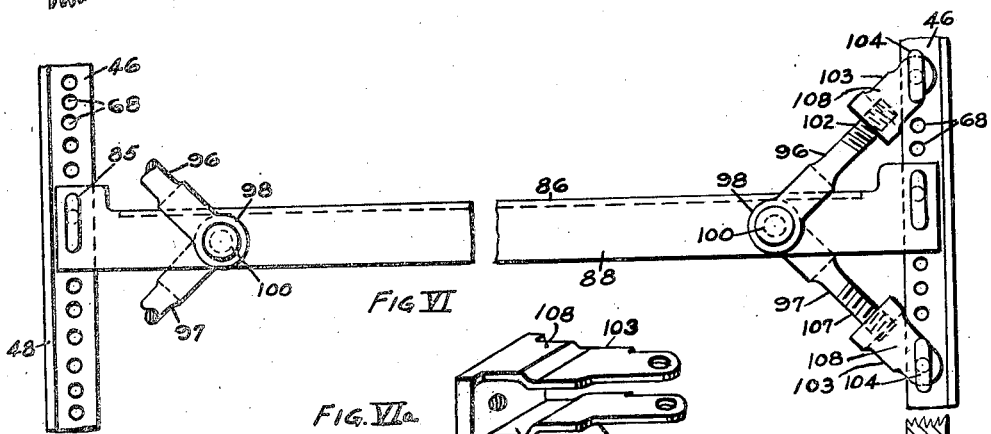
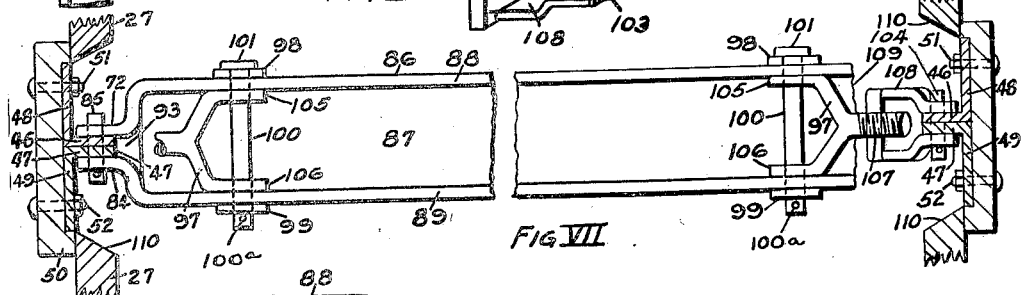
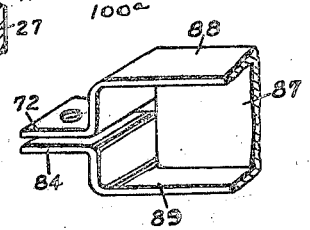

Oct. 6, 1936.   N. T. ANDERSON   2,056,704
CARGO MERCHANDISE BRACING MEANS
Filed Nov. 8, 1934   5 Sheets-Sheet 5
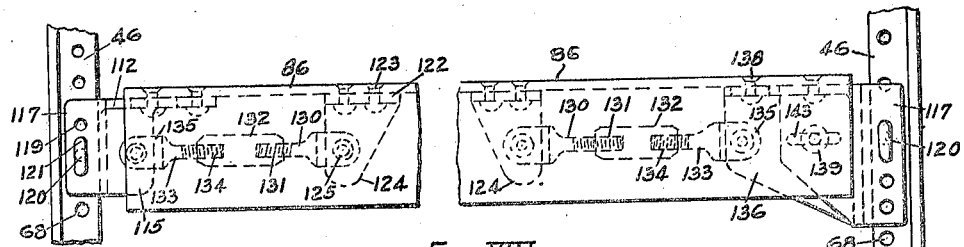
FIG VIII
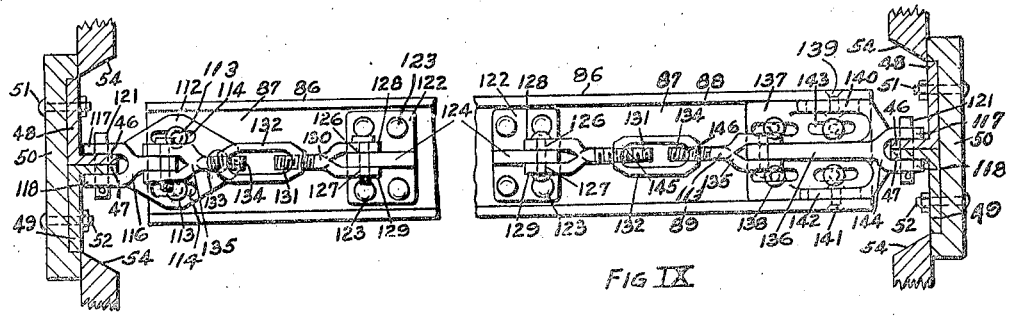
FIG IX
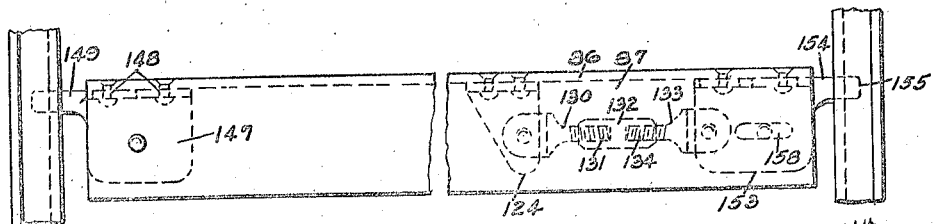
FIG X
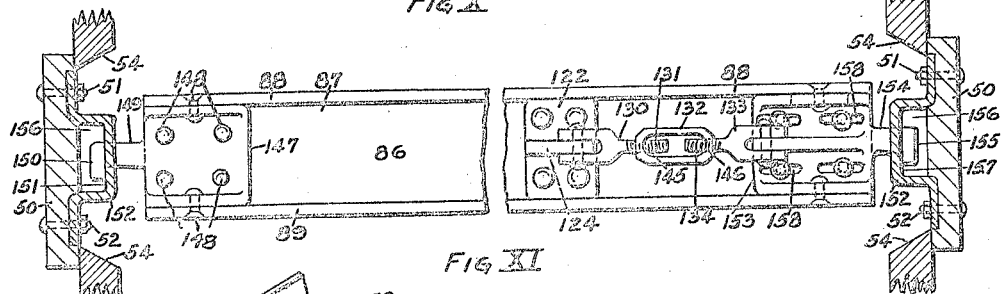
FIG XI
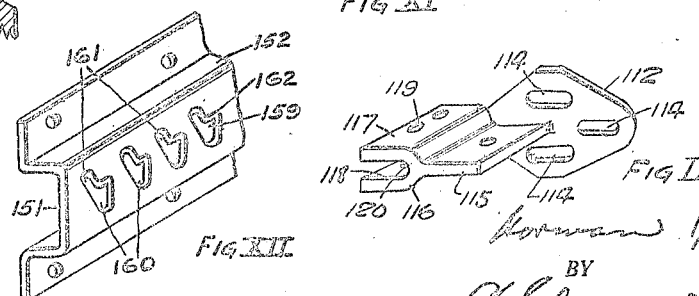
FIG XII   FIG IXa
INVENTOR.
Norman T. Anderson
BY
ATTORNEY.

Patented Oct. 6, 1936

2,056,704

UNITED STATES PATENT OFFICE 2,056,704

CARGO-MERCHANDISE BRACING MEANS

Norman T. Anderson, Washington, D. C.

Application November 8, 1934, Serial No. 752,173

15 Claims. (Cl. 105—369)

This invention relates to a method of bracing full (CL) or part load (LCL), shipments packed in various types of containers, intended more particularly for use in refrigerator cars, but not confined nor restricted to that use.

It is generally customary for the shipper to furnish and install all load bracing devices including stripping, dunnage, etc., for properly stowing the particular shipments being made, be it a partial or full load of barrels, boxes, crates, cartons, baskets, or a combination of any two or more of these, to prevent damage to the contents of the containers or the containers due to shifting of the load while in transit. Poorly braced loads not only cause considerable damage due to package breakage requiring recoopering, but also results in contents falling out of the containers.

Some of the forms of bracing systems for full or part loading of shipments now in use are not practicable for efficiently bracing the loads due to the fact that the shipper spends as little as possible for bracing materials and seldom, if at all, has an opportunity of seeing the condition of the load he stows in the car upon arrival at destination for unloading. The load bracing generally used consists of 2" x 4" lumber when straight or part loads of boxes or crates are concerned while the bracing generally used when shipping barrelled goods may consist either of bands of metal wrapped around the entire load or 4" x 4" bracing across the car dividing the load in sections so as to reduce the bending strain on the cross bracing.

It is the purpose of this invention to provide a semi-permanent type of load bracing which may be installed as a whole or part in the car, being applicable for refrigerator cars, box cars, trucks or in the hold of ships. With the type of bracing system covered by this invention the shipper need only furnish dunnage or tier stripping in order to provide a compact load or to provide air channels between the rows and tiers of containers as is generally the practice when loading refrigerator cars. In this way the shipper furnishes less material for stowing his load; auxiliary bracing will be available from the railroad or car owner at nearby points should additional units of the bracing system covered by this system be required.

When using 2" x 4" or other lumber for bracing loads of cars it often happens that the shipper nails bracing boards to the car lining in order to hold his transverse load bracing members in position. Such practices not only damage the car lining, but often as in refrigerator cars, puncture some of the car insulation resulting in a loss in insulating efficiency of the cars as a whole.

This invention provides for a semi-permanent type of bracing which is flexible to such an extent that it is adaptable for any type of load as regards shape of containers to be braced and may be considered as a whole or in part as a part of the car, just as the floor racks are considered as a permanent part of the car even though they are easily removable. The bracing may, also, be considered as part of the car equipment just as hoisting devices and bracing are placed in cars for automobile loading.

It has further for its object a means for taking up slack in the loads to insure the component parts of the load being held together, by reason of the close adjustment possible at end connections.

It has further for its object a means for bracing or separating a load in a car divided as for peddlar service as no portion of the bracing when the car is empty projects into the car loading space except the cross members which are removable and which may be shifted to any desired position in the car.

To be flexible, bracing requires that some of the parts be removed in order that the load may be braced in one position or any number of positions in the car. Where the average shipment requires fixed locations for the transverse bracing they may be made so as to be part of the permanent equipment although it is primarily intended that the side wall members be considered as permanent car parts while the transverse bracing members are to be part of the car equipment like meat hooks, which are readily removable, are considered as part of the car equipment in the transportation of meats.

To the accomplishment of the foregoing and such other objects as may hereinafter appear, the invention consists in features hereinafter particularly described and then sought to be clearly defined by the claims, reference being had to the accompanying drawings, forming a part hereof and in which:

Figure I is a longitudinal vertical cross sectional elevation of one end of a refrigerator car, taken along line AA of Figure II showing bracing used with a combination part load of barrels and boxes;

Figure II is a transverse vertical cross sectional elevation taken along line BB of Figure I;

Figure III is a horizontal longitudinal cross sectional plan view of one end of a refrigerator car taken along line CC of Figure II;

Figure IV is an enlarged plan view of the type of bracing illustrated in the upper portion of Figure II for box or crate loading;

Figure V is front elevation of the bracing shown in Figure IV;

Figure VI is an enlarged plan view of a form of bracing for barrel loading;

Figure VIa is an isometric view of one form of jaw connection between a cross-brace and rail;

Figure VII is a front elevation of the bracing shown in Figure VI;

Figure VIIa is an isometric view of one end of the cross-brace shown in Figure VII, broken away;

Figure VIII is an enlarged plan view of the type of bracing illustrated in the lower portion of Figure II for barrel loading;

Figure IX is a front elevation of cross bracing shown in Figure VIII;

Figure IXa is an isometric view of one form of end bracket between cross brace and rail;

Figure X is an enlarged plan view of another modified form of bracing for barrel loading;

Figure XI is a front elevation of cross bracing shown in Figure X;

Figure XII is an isometric view of the brace support shown in Figures X and XI.

In the diagrams the numeral 1 designates a portion of one end of a car body of the generally constructed type for refrigeration service. Numeral 2 represents the side sills, 3 intermediate sills and 4 center sills, over these is a sub-floor 5, with floor insulation 6, and top floor 7. The load may be placed directly on top of car floor 7 or on top of an auxiliary floor consisting of floor rack slats 8 which are spaced apart so as to provide openings 9 for air circulation. The slats 8 are secured to stringers 10 so as to provide air channels 11 directly under the load. The car floor is generally depressed under the ice bunkers 12 at end of car as shown in Figure I so that floor 13 is below the level of 7 in the body of the loading space of car, with insulation 6 continuous from end to end of car so as to provide the greatest insulating efficiency.

The ice bunker 12 is separated from the loading space of car by an insulated partition or bulkhead consisting of transverse lining 14, insulation 15 and insulation protection boards 16, these boards being applied between the bulkhead posts 17 to which they are secured by nailing strips 18. The separating partition or bulkhead is so constructed as to provide opening 19 at top thereof and 20 at bottom thereof. See Fig. I. The top opening 19 is covered with a screen 21 on the loading space side. Against the bulkhead posts 17 screen 22 is applied so as to provide air channels 23 between posts 17. See Fig. III. A similarly constructed screen 24 is applied at each side wall of the ice bunker, to side posts 25 so as to provide air spaces 26 between screen 24 and car lining 27 while at the end of car a screen 28 is secured to posts 29 so as to provide air spaces 30 between screen 28 and lining 31.

The car end construction consists of car lining 31, posts 32, insulation 33 and end sheathing 34. The side wall construction consists of side lining 27, framing 35, insulation 36 and side sheathing 37. The roof consists of ceiling 38, one course of insulation 39 under carlines 40 and also insulation 41 between carlines with top roof 42, running boards 43 and running board saddles or supports 44. The top roof is provided with openings or hatches 45 at the corners of car for placing ice 12a in the ice bunker 12 with the ice resting on ice grid or grate 12b. When the ice bunker has been filled to the desired depth with ice, plugs (not shown) are fitted into the sloping sided hatch openings 45.

Set into the car side wall lining 27 are horizontal steel members consisting of any shape such as channels, T-bars or angle bars shown in one or more sets in which two angle bars are placed so their horizontal flanges 46 and 47 are parallel with each other and constitute a rail for supporting the ends of cross-brace members, and when formed of angle-bars their vertical legs 48 and 49 lie against and are bolted to side wall reinforcing cripples or blocks 50 by bolts 51 and 52, set back of the side wall car linings 29. The side wall lining may be cut square at the angle bar installation as indicated at 53 in Figure II, or beveled as at 54 in Figure V. The outer edge of the flanges 46 and 47 preferably does not protrude beyond face of car lining 27. The vertical legs of the L-shaped bars may lie against the inside face of the car lining 27 and be attached thereto by bolts like 51 and 52, although in such case the horizontal flanges 46 and 47 will project to some extent into the car loading space as will be obvious.

The braces, transverse, for the load may be of the form shown in any of Figures IV, VI, VIII, or X, or any combination of these, but for illustrative purposes the type shown in Figure IV is preferred as bracing for the top loading of boxes, as indicated in Figs. II and III, and the type shown in Figure VIII preferred for barrel loading, as also indicated in Figs. II and III.

The bracing illustrated in Figures IV and V consists of a flexible webbing 55, of wire, cotton or linen strands forming a webbing, or steel mesh webbing, suitably reinforced by metal strands, or otherwise. At each end of the webbing 55 castings 56 are applied by rivets 57, or otherwise, which may have button heads as 58 or countersunk heads 59, these being of such size and number as to produce a connection for giving substantially the same strength as the strength of the webbing proper.

The webbing is applied so as to have face 60 or 61 in contact with containers as for instance boxes 62 shown, with or without dunnage boards 63 between same. The webbing being flexible will fit the contour of the shape of the barrel 64 if used for bracing barrels. When loading boxes, there is usually a slack space due to the width of boxes 62 not fitting exactly between car linings and resulting in slack spaces 65 which may be staggered at each tier or row or may be divided as at 66 and 67 (see Fig. III). When staggered the webbing bracing 55 provides a closer adjustment in length, making the load more compact as the side wall horizontal members 46, 47 being provided with holes 68 for pins 69 spaced at appropriate intervals permit a better take up lengthwise of the car, as the cross members 55, being flexible, will better fit to the ends of the containers. The pins 69 are provided with T-heads 70, and a hole 71 through the lower part of each shank may receive a cotter pin, pad lock or other suitable securing means. End castings 56 of the webbing are made with end jaws 72, the jaws at one end of the webbing receiving an eye 73 of rod connection 74 so that a pin 75 having head 76 and a hole in its shank to receive a cotter pin 77, as shown in Figure V, or instead of the pin 75 a rivet, may be used to pass through holes 78 of jaws 72 and hole 79 of the eye 73 of rod connection 74. One end of rod connection 74 is threaded as shown at 80 for connection with a turnbuckle 81. The turnbuckle 81 at one end has a threaded connection 82 with a rod 83 formed at one end with jaw members 84 to receive the flanges 46, 47 of side wall members 48 and 49, a headed pin 69 being passed through holes in the jaw members 84 and selected corresponding holes 68 in the flanges 46 and 47 of side wall rail members 48 and 49 so as to connect said parts together. Under the turnbuckle features specified, by turning the turnbuckle slack may be taken up in the webbing brace 55, and also between the barrels, both transversely and longitudinally of the car. Instead of providing both ends of the webbing brace 55 with the turnbuckle features, one end of the webbing only may be provided with the turnbuckle features, and the other end provided with a casting 56 formed with jaws 72 to receive the flanges 46, 47 of the side wall rail members 48, 49, and a headed pin 69 passed through holes formed in the jaws 72 and selected corresponding holes formed in the meeting flanges 46, 47 of the members 48, 49, as shown in Figure V of the drawings.

The bracing illustrated in Figures VI and VII may be used for crates, boxes, cartons, and like containers. This type of bracing consists of metal cross members of any desired shape although pressed channel members 86 have been shown as preferable. These members consist of pressed metal sections with web portion 87, top flange 88 and bottom flange 89 with well rounded corners 90 and 91 to fit against bilge portion 92 of barrels 64, see Figure I, in order to prevent cutting into the barrel staves, or cartons if used to brace cartons. The bracing extends across the car. The ends of member 87 with top and bottom flanges 88 and 89, are cut and bent as shown in Figure VII<sup>a</sup> to form jaw shape members 72 and 84 to the bracing so that T-head pin 85, or other suitable fastenings, may be used to hold the bracing in position. A short distance from each end of braces 86, obliquely extending rod take-up connections 96 and 97 are applied. The connection 96 is provided with upper and lower jaw portions 98 and 99 fitting over top and bottom flanges 88 and 89 of the cross channel member 87 and pivotally connected thereto by pin or pintle 100 having an enlarged head 101 and a hole 100<sup>a</sup> in its lower portion for application of a cotter key, or padlock; or the pin 100 may be made with a rivet head at top and bottom, thus making a permanent loose connection. Outer end of connection 96 is threaded as at 102 for application of threaded jaw connection 103 formed with upper and lower jaws, similar to jaws 72 or 84 of the webbing brace to fit over side wall rail members 46, 47 and receive T-head pin 104 similar to the pin 69 which will enter selected registering holes 68 in the rail members.

Brace connection 97 is fitted with jaw members 105 and 106 to fit inside of cross member channel 86, so as to use pin 100 which is also used for jaws of brace takeup 96. (See Figs. VI and VII.) Brace connections 97 are likewise threaded as at 107 for take up jaw 108 made identical with jaw 103 for fitting over side wall rail members 46 and 47 in order that close adjustment of the brace may be made longitudinally of the car by taking up or letting out slack in brace connections 96 or 97 as the case may require. End of channel member 85 is shown broken away at 109 (Fig. VII) in order to more clearly show the construction of jaw connection 108.

The car lining may be beveled at the side wall supports as shown at 110 in Figure VII, or made square as shown at 111 in Figure II.

Another modified form of cross bracing is shown in Figures VIII and IX to be used where knee or K bracing take-up connections 96 and 97 are not practicable due to cartons being fitted squarely into the corner where the braces occur.

This modified form, which may be used for barrel, box, crate, or other type of container, consists of the same general cross member construction shown as being of pressed metal members 86 although any other suitable construction may be used and still come under the general scheme. The cross member construction may be provided with take-up at both ends, as shown in Figures VIII and IX, or at only one end, not shown.

This modification includes an end bracket 112, shown in Figure IX<sup>a</sup>, slidably attached at one end of the web 87 by rivets 113. The casting or bracket 112 is formed with slots 114 for the rivets 113, and the bracket is also formed with an outstanding flange 115 which has at one end a jaw 116 composed of top and bottom members 117 and 118 formed with holes 119 and 120 to receive a T-headed pin 121 which will pass through said holes 119 and 120 and also registering holes 68 formed in the side wall rail members 46 and 47. The end bracket 112 is shown riveted loosely to web 87 of cross brace channel member 86 although it may be securely riveted thereto and without any take-up device such as turnbuckle as shown. The cross brace member 86 is also provided with a casting or bracket 122 (Fig. IX) riveted to web 87 of channel member 86 by rivets 123, the bracket being provided with center web or rib 124 having a hole for register with holes 126 and 127 of jaw members 128 and 129 made as part of take-up connection rod 130. The rod 130 is threaded at 131 for connection with turnbuckle 132 which also co-acts with a similar take-up connection rod 133 threaded at 134 for threaded connection with turnbuckle 132, and provided with jaw members 135 to receive web member 115 of casting or bracket 112 attached to end of cross brace 86.

The other end of cross brace 86, shown in Figs. VIII and IX, is similarly constructed, except that jaws 135 fit over and under web member 136 of end casting or bracket 137. The end casting or bracket 137 is secured to web 87, by rivets 138, and also by rivet 139 passing through casting flange 140, and rivet 141 passing through lower flange 142 of the casting 137 and through lower flange 89 of cross brace channel 87 (see Fig. IX). The holes in casting or bracket 137 for all of these rivets are elongated as at 143 in order that when turnbuckle 132 is operated, casting 137 will slide or be drawn closer to or forced farther away from casting 122 as found necessary to suit width of car for side wall rail members 46 and 47 spacing. Bracket or casting 137 is also provided with jaw end section 144 to fit over and under side wall rail members 46 and 47 for locking or holding in position by T-head pin 121, there being several holes in each of the jaw members 144 so as to provide for close adjustment of the cross brace longitudinally along side rail members 46 and 47 so as to bring one hole in jaw 144 into register with one of the holes 68 in side wall rail members 46 for pin 121 as indicated in Fig. VIII.

The inner take-up connection 130, Figure IX, may be provided with a riveted over or upset end instead of threaded end 131 so that it might be free with rivet head or upset end against surface 145 of turnbuckle 132 so that the entire take-up will be by or on connection 133; or the 133 connection may have its end riveted over against surface 146 of turnbuckle 132, instead of being threaded as at 134 so that the take-up may be between threaded portion 131 of connection 130 and the turnbuckle 132 only.

In the modified form of cross brace shown in Figures X and XI, the casting or bracket 147 is riveted rigidly to web member 87 and also to top flange 88 and bottom flange 89 of cross brace 86 by rivets 148. The bracket has an extension 149 provided with lip 150 to bear against face 151 of side wall support 152 shown in perspective Fig. XII. Support 152 is preferably of the pressed shape shown although not confined to that particular construction. The supports 152 for opposite ends of the cross brace 86 are bolted to car frame member 50 shown in Figure XI by bolts 51 and 52. The left end of cross brace 86 is shown without any take-up while the right hand section shows take-up means. It will be understood that one or both ends may be provided with take-up adjustment means. In the right hand portion, bracket 122 is riveted to web 87 of cross brace channel 86 as in the case of Figures VIII and IX with the same type of take-up turnbuckle arrangement. End bracket 153 however, is provided with extension 154 similar to 149 shown at left end of cross brace, Figures X and XI, with lip 155 passing into open space 156 of side wall support 152 and adjusted to fit against inner face 157 of side wall support 152 by moving bracket 153 in or out to suit spacing necessary between lips 150 and 155. Bracket 153 is provided with slots 158 to permit moving the bracket longitudinally of the cross brace 86 similar to arrangement shown in Figures VIII and IX.

In the isometric view, Figure XII, the side wall supports 152 are shown with slots 159 to receive the extension lips 150 and 155 and arranged so that bottom portion of the lips will just clear the bottom of the openings 160, and by positioning cross brace 86 at an angle when fitting same into supports 152 the top portion of extensions 149 and 154 will just clear the top edge 161 of slots 159. When the cross brace is then righted into vertical position the top portion of extensions 149 and 154 will just clear the projection 162 and extending into the slot 159, and will prevent the cross brace from moving upwards and thus prevent the cross brace from coming out of the slots.

When barrels, boxes or crates have been placed in position in a car the transverse brace members are set in position with the pins at side wall connections placed in the hole that registers or comes closest to coinciding by slight shifting. It will be observed that adjustment will be available for any type of container, and that the cross bracings may be locked at one end to a side of the car, to prevent removal thereof when the car is unloaded.

It will be further observed that the jaws which have an interlocking connection with the longitudinally extending side wall rails have also a pivotal connection relatively to the cross brace. This will permit a greater or lesser swinging movement of the bifurcated connecting jaw member so as to bring the holes or eyes of the jaw members into register with the holes or openings 68 in the side wall rail forming members 48, 49, and thus provide for a closer adjustment of the cross bracing member longitudinally of the loading chamber, and a closer fitting of the bracing member against the merchandise, or boxes or barrels containing the merchandise, stored or packed in the merchandise cargo carrier. The pivotal connection between the cargo cross-brace and the rails along which the brace is adjustable, as illustrated in Figs. IV and V, consists in part of the pivot pin 75 which connects turnbuckle element to the jaw elements of the castings or brackets 56 attached to the end of the cross-brace; in Figures VI and VII it consists in part of jaw elements 108, threaded rods 96, 97, and pintles 100, pivotally connecting with the cross-brace member 86; in Figs. VIII and IX it consists in part of the turnbuckle elements pivotally connected by pintles or pins with brackets or castings 112, 122 and 137 to the cross-brace member 87; and in Figs. X and XI it consists in part of the turnbuckle elements connected by pintles or pins to the brackets or castings 122, 153, as illustrated therein. It will be understood that changes may be made in details of various parts and essential features of the invention still be embraced within the scope of the invention as sought to be defined by the claims.

It is also to be noted that in any tendency of the cargo to shift or change its position due to jolts and lurches of the carrier, the stresses and strains created by shifting of the cargo are transmitted through the cargo brace to the side wall rails, and in the direction of the length of said rails, and by the cross brace exerting an inward pull towards the central portion of the cargo space, away from the side walls of the conveyor, instead of an outward pressure against the side walls of the conveyor, with the result that the cargo is confined substantially within the area of its compression instead of exerting an outward pressure on the side walls which if not restrained would tend to bulge the walls outwardly and enlarge the confining space area and thus contribute to a greater displacement of the cargo, and to weakening of the side walls.

It will also be observed that by the exactness and minute adjustment obtainable in the cargo brace under the construction described and the positive locking of the brace to its adjustment, with no possible shifting or loosening of the positive fastening of the brace to the side wall rails, a more efficient bracing of the cargo against shifting and displacement is obtainable.

In Figs. II and V to IX of the drawings, the flanges 46 and 47 of the rails are shown as in contact with each other, and the jaws or projecting portions at ends of the cross-braces as spanning or embracing said flanges, but it is obvious without detail illustration that the horizontal flanges of the rails may be spaced apart, one from the other, and a jaw, or an end extension of the cross-brace, formed with an eye or opening, may lie between the spaced apart flanges, or lap the flanges, and a pinlike connector be passed through the eye in the jaw, or in the end extension of the brace and a registering opening in the rail so as to interlock the rails and cross-braces together. Also, if the rails be formed of T-bars as mentioned, and secured to the side walls of the car and the horizontal flange of the T-rail be provided with openings, the jaws of the cross-braces may span or embrace the flange of the T-rail, and the connecting pin be passed through registering openings in the rails and jaws, or cross-brace extension, so as to interlock the cross braces with the rails. This is so obvious that a detail illustration is unnecessary and is included within the scope of some of the claims made herein.

In Figs. X and XI of the drawings, the "pinlike connector" for locking the cross-brace and rails together consists of the shanks 149 and 154 projecting from opposite ends of the cross-brace and whose bent or deflected ends 150 and 155 pass through selected openings 159 in the rail members 152, which are shown of channel bar type; whereas in other figures of the drawings, the "pin-like connectors" are the pins (such as 70) which pass through registering openings in the rails and in some member or part carried by the cross-brace.

Having described my invention and set forth its merits what I claim is:

1. A cargo merchandise brace comprising a member to extend across the interior of a cargo-shipment-carrier, bars extending longitudinally of the merchandise chamber of the carrier and formed with laterally extending flanges constituting rails, the bars and their flanges being disposed substantially wholly within recesses formed in side walls of the merchandise chamber so as to leave the interior of said chamber free from projecting portions of the bars and flanges, said flanges being apertured and standing away from the walls of the recesses, members attached to opposite ends of said brace member and provided with jaws spaced to straddle the said rail flanges and adapted to be placed in engagement with the flanges from the side at any desired point along the length thereof, said jaws being formed with apertures to be brought into register with the apertures of the rails, and means for interlocking connection between the ends of the cross brace and the apertured rails.

2. A cargo merchandise brace comprising a brace member to extend across the interior of a cargo-shipment carrier, rails extending longitudinally of the merchandise receiving chamber of the carrier and formed with a series of apertures to provide for adjustment of the brace member longitudinally of the rails, members slidably supported on said brace member adjacent its ends and provided with jaws for engagement with the rail members, said jaws and rails being formed with registering apertures to receive pins for locking engagement between the jaws and rails, and means for adjustment of the jaw carrying slidable members lengthwise of the brace member for shortening or increasing the length of the cross-brace relatively to the sides of the cargo carrying chamber; said rails lying substantially wholly within recesses formed in the sides of the cargo containing chamber with no portion of the rails projecting into the cargo loading space.

3. A cargo merchandise brace comprising a brace member to extend across the interior of a cargo-shipment carrier, rails extending longitudinally of the cargo carrier and lying substantially wholly within recesses in the sides of said carrier, brackets slidably mounted on the cross-brace for adjustment longitudinally of the brace and provided with an extension for pin locking engagement of the cross brace with said rails, and means for adjustment of said brackets longitudinally of the cross-brace.

4. A cargo merchandise brace comprising a brace member to extend across the interior of a cargo-shipment carrier, rails within the carrier, extending longitudinally of the carrier and lying substantially wholly within recesses in the sides of said carrier, brackets mounted on the cross-brace and provided with a member to project beyond the brace-member for pin interlocking engagement with the rail, at least one of said brackets being slidably mounted on the cross-brace, and means for adjustment of the slidably mounted bracket longitudinally of the cross-brace.

5. A cargo merchandise brace comprising a brace member to extend across the interior of a cargo-shipment carrier and having a length approximating the width of the carrier interior, rails extending longitudinally of the carrier for supporting the cross brace, brackets mounted on the opposite ends of the cross-brace and provided with a member to project beyond the end of the brace member and engage the rails that support the cross-brace, at least one of said brackets being secured on the said brace, and means connecting the bracket and brace for producing relative movement to effect a sliding adjustment of the bracket on the brace, said rails being formed with apertures to receive a pin-like connector for effecting interlocking engagement between the cross-brace and the rails.

6. A cargo merchandise brace comprising a brace member to extend across the interior of a cargo-shipment carrier, rails extending longitudinally of the carrier for supporting the cross-brace, brackets mounted on the cross-brace and supporting beyond at least one end of the brace, a jaw like member for engagement with a rail, means for positively and slidably adjusting said jaw-like member and its supporting bracket longitudinally of the cross-brace and toward or away from the rail with which said jaw member will engage; said rails lying substantially wholly within recesses in sides of the cargo-container.

7. A cargo-brace comprising a member to extend transversely across the loading space of a cargo-carrier, side rails extending longitudinally of the loading space, and means for attachment of the brace at its ends to said rails, said means comprising a rigid member including a jaw supported from the brace, said jaw being mounted for adjustment towards and from a side rail for engagement therewith, said rigid member having its inner end pivotally mounted on the brace for adjustment of the point of engagement of the jaw with a side rail.

8. A cargo-brace comprising a member to extend transversely across the loading space of the cargo-carrier, side rails extending longitudinally of the loading space and set substantially wholly within the side walls of the carrier, and means for attachment of the brace at its ends to said side rails, said means including jaw members supported from the brace, at least one of said members being mounted for adjustment for engagement with a side rail and pivotally mounted with relation to the brace for adjustment to the point of engagement with the side rail, said rails being formed with apertures disposed longitudinally of the rails, said jaw members being provided with apertures to register with the apertures of the rails, and pintles passing through the apertures of said members in register with apertures of the rails for locking said members and rails together.

9. In a cargo brace for the merchandise chamber of a carrier, the combination comprising flanged rails extending longitudinally of the merchandise chamber and being disposed wholly within recesses formed in the side walls of the merchandise chamber so as to leave the interior of said chamber free from projecting portions of the flanged rails, a flange of each of said rails projecting away from the walls of the recess within which it is disposed, a brace member in the form of a band of flexible webbing to extend across the interior of the merchandise chamber, jaws attached to opposite ends of said brace member for engaging said rail flanges and slidable thereon to the desired position of adjustment, said jaws being spaced to straddle said rail flanges and adapted to be placed in engagement with the rails from the side at any desired point along the length thereof, and means for pivotally interlocking said jaws and rail flanges in the adjusted positions, the pivotal axis of said interlocking means being vertical to permit horizontal pivotal movement of said jaws as said brace member conforms to the shape of the cargo being braced.

10. In a cargo brace for the merchandise chamber of a carrier, the combination comprising rails extending longitudinally of the merchandise chamber, a brace member to extend across the interior of the mechandise chamber, bifurcated members attached to opposite ends of said brace member for engaging said rails and slidable thereon to the desired position of adjustment, each of said bifurcated members comprising a pair of branches spaced to straddle one of said rails and adapted to be placed in engagement with the rail from the side at any desired point along the length thereof, and means for interlocking said bifurcated members and rails in the adjusted positions.

11. A cargo brace in accordance with claim 10, having means for adjusting at least one of the bifurcated members longitudinally of the brace member.

12. In a cargo brace for the merchandise chamber of a carrier, the combination comprising flanged rails extending longitudinally of the merchandise chamber of the carrier, a flange of each of said rails having apertures spaced therealong, a brace member to extend across the interior of the merchandise chamber, apertured and bifurcated members attached to opposite ends of said brace member for engaging said rail flanges and adapted to slide thereon to align the apertures of said bifurcated members and flanges, said bifurcated members being adapted to straddle the rail flanges and to be placed in engagement with said flanges from the outer side edges thereof and at any desired point therealong, and pins to be passed through the aligned apertures for locking said bifurcated members and rail flanges together.

13. In a cargo brace for the merchandise chamber of a carrier, the combination comprising flanged rails extending longitudinally of the merchandise chamber and being disposed substantially wholly within recesses formed in the side walls of the merchandise chamber so as to leave the interior of said chamber free from projecting portions of the flanged rails, a flange of each of said rails projecting away from the walls of the recess within which it is disposed, a brace member to extend across the interior of the merchandise chamber, jaws attached to opposite ends of said brace member for engaging said rail flanges and slidable thereon to the desired position of adjustment, said jaws being spaced to straddle said rail flanges and adapted to be placed in engagement with the rails from the side at any desired point along the length thereof, and means for interlocking said jaws and rail flanges in the adjusted positions.

14. In a cargo brace for the merchandise chamber of a carrier, the combination comprising rails extending longitudinally of the merchandise chamber and being disposed substantially wholly within recesses formed in the side walls of the merchandise chamber so as to leave the interior of said chamber free from projecting portions of the rails, each of said rails being angular in cross section and supporting an angularly disposed and apertured side in a position spaced from the walls of the recess within which it is disposed, a brace member to extend across the interior of the merchandise chamber, and extensions on the ends of the brace member adapted to have pin interlocking engagement with the apertures in said rail side.

15. In a detachable brace for use in railway vehicles to prevent shifting of the load, the combination comprising, a flat load engaging element of a length approximating that of the width of the interior of the vehicle and having secured thereto adjacent one end thereof an adjustable extension for changing the overall length of the brace, side wall engaging means at opposite ends of the brace, and flanged side wall fixtures secured within side wall recesses of the vehicle to support and retain the brace in a load bracing position transversely of the car.

NORMAN T. ANDERSON.